(12) United States Patent
Ason et al.

(10) Patent No.: US 7,108,428 B2
(45) Date of Patent: Sep. 19, 2006

(54) AXLE ASSEMBLY WITH BEARING ADJUSTMENT MECHANISM

(75) Inventors: Richard A. Ason, Plymouth, MI (US); Jeffrey S. Jackson, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 172 days.

(21) Appl. No.: 10/968,767

(22) Filed: Oct. 19, 2004

(65) Prior Publication Data

US 2006/0083454 A1    Apr. 20, 2006

(51) Int. Cl.
*F16C 35/06* (2006.01)
*F16H 48/06* (2006.01)

(52) U.S. Cl. ............... 384/583; 29/898.09; 384/519; 475/230

(58) Field of Classification Search ............... 384/519, 384/563, 583; 475/230, 245–248, 253; 29/898.07, 29/898.09, 407.01; 74/606 R
See application file for complete search history.

(56) References Cited

U.S. PATENT DOCUMENTS

| | | | | |
|---|---|---|---|---|
| 1,774,160 A | * | 8/1930 | Sweet | ............... 384/583 |
| 2,424,013 A | * | 7/1947 | Bechler | ............... 384/519 |
| 3,260,132 A | * | 7/1966 | West et al. | ............... 475/246 |
| 3,770,994 A | | 11/1973 | Smith | |
| 3,774,466 A | | 11/1973 | Bhatia et al. | |
| 3,826,151 A | | 7/1974 | Geppert et al. | |
| 3,875,646 A | | 4/1975 | Pfeiffer et al. | |
| 3,900,232 A | | 8/1975 | Rode | |
| 4,742,725 A | | 5/1988 | Nagai et al. | |
| 5,560,687 A | | 10/1996 | Hagelthorn et al. | |
| 6,004,040 A | | 12/1999 | Rode | |
| 6,357,927 B1 | | 3/2002 | Myers et al. | |
| 6,398,689 B1 | | 6/2002 | Morse et al. | |
| 6,450,914 B1 | | 9/2002 | Irwin et al. | |
| 6,533,697 B1 | | 3/2003 | Morse et al. | |
| 6,544,140 B1 | | 4/2003 | Gradu et al. | |
| 6,685,359 B1 | * | 2/2004 | Wickens | ............... 384/563 |
| 6,796,031 B1 | | 9/2004 | Russell | |

FOREIGN PATENT DOCUMENTS

| | | |
|---|---|---|
| EP | 0603510 | 6/1994 |
| GB | 2386652 | 9/2003 |
| JP | 0201772 | 1/1990 |

* cited by examiner

*Primary Examiner*—Thomas R. Hannon
(74) *Attorney, Agent, or Firm*—Harness, Dickey & Pierce, P.L.C.

(57) ABSTRACT

The present invention provides an axle assembly for a motor vehicle including an axle housing, a differential assembly supported in the axle housing with a differential bearing, a bearing insert, an adjuster sleeve and a lock ring. The bearing insert is coupled to the axle housing. The adjuster sleeve is rotatably coupled to the bearing insert in a pre-installed position. The adjuster sleeve is adapted to engage the differential bearing and impart a preload force thereon. The lock ring is disposed between the bearing insert and the adjuster sleeve in an installed position. The lock ring precludes relative movement between the bearing insert and the adjuster sleeve thereby maintaining a desired preload on the differential bearing.

23 Claims, 8 Drawing Sheets

AXLE ASSEMBLY WITH BEARING ADJUSTMENT MECHANISM

FIELD OF THE INVENTION

The present invention relates generally to differentials for use in automotive drivelines and, more particularly, to an arrangement and method for setting a differential bearing preload.

BACKGROUND OF THE INVENTION

Some automotive drive axles include a differential assembly including a gear set which is supported within a differential housing to facilitate relative rotation between a pair of output shafts. The gear set typically includes a pair of helical side gears that are splined to the ends of axle shafts. The helical side gears are meshed with paired sets of helical pinions generally supported on a cross pin coupled to the differential housing. In response to speed differentiation between the output shafts, torque transmitted through meshed engagement of the side gears and pinions generates thrust forces that are exerted by the gear components against the wall surface of the differential housing to frictionally limit the speed differentiation and proportionally deliver torque between the output shafts.

In addition, many automotive drive axles include a hypoid gear set for changing the direction of power transmission from an axis parallel to the direction of vehicle travel to an axis perpendicular thereto. The hypoid gear set includes a ring gear coupled to the differential housing and a pinion gear journally supported within the axle housing. To facilitate proper function of the drive axle assembly, the differential is mounted on a pair of slidable differential bearings.

In one arrangement, a sleeve and insert assembly is pressed into the axle housing outboard of the differential bearing. The sleeve typically includes castle extensions formed on an outer face for engagement with an adjustment tool. The sleeve is rotatably driven relative to the insert with the adjustment tool and toward the differential bearing. The differential bearing preload and hypoid gear backlash are then measured. The sleeve may be adjusted accordingly to achieve a desired measurement. Once the desired preload and backlash are set, a clip is positioned in engagement with adjacent castles on the sleeve to lock the sleeve relative to the axle housing and, consequently, maintain the desired bearing preload and backlash. The clip is typically held in a cast pocket in the axle housing by grease prior to deflection. Once deflected, the clip is retained on a first end by adjacent castles on the sleeve and retained on an opposite end between the axle housing pocket and insert.

While the aforementioned arrangement has been useful in retaining the differential bearings at the desired location, the assembly process is complicated and time consuming due to the alignment of the clip relative to adjacent castle extensions. Furthermore, the step of deflecting the clip can be difficult and may require an installer to back-off or further tighten the adjuster sleeve to align respective castles on the adjuster sleeve for receipt of the clip. In the event that the adjuster sleeve needs to be backed-off or tightened, the bearing preload or hypoid gear backlash may consequently be moved to a less desirable measurement. Therefore, a need exists to provide an improved arrangement for setting bearing preload and gear set backlash.

SUMMARY OF THE INVENTION

The present invention provides an axle assembly for a motor vehicle including an axle housing, a differential assembly supported in the axle housing with a differential bearing, a bearing insert and a lock ring. The bearing insert is coupled to the axle housing. An adjuster sleeve is rotatably coupled to the bearing insert in a pre-installed position. The adjuster sleeve is adapted to engage the differential bearing and impart a preload force thereon. The lock ring is press-fit between the bearing insert and the adjuster sleeve in an installed position. The lock ring precludes relative movement between the bearing insert and the adjuster sleeve thereby maintaining a desired preload on the differential bearing.

According to other features, an outer diameter of the bearing insert forms a press-fit between an inner diameter defined by an opening in the axle housing. The adjuster sleeve includes a plurality of slots defined around a raised wall extending radially around an outboard surface for accepting teeth of an adjustment tool during installation. The bearing insert includes inner serrations defined around an inner diameter. The adjuster sleeve includes outer serrations defined around an outer diameter. The lock ring engages the inner and outer serrations in an installed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
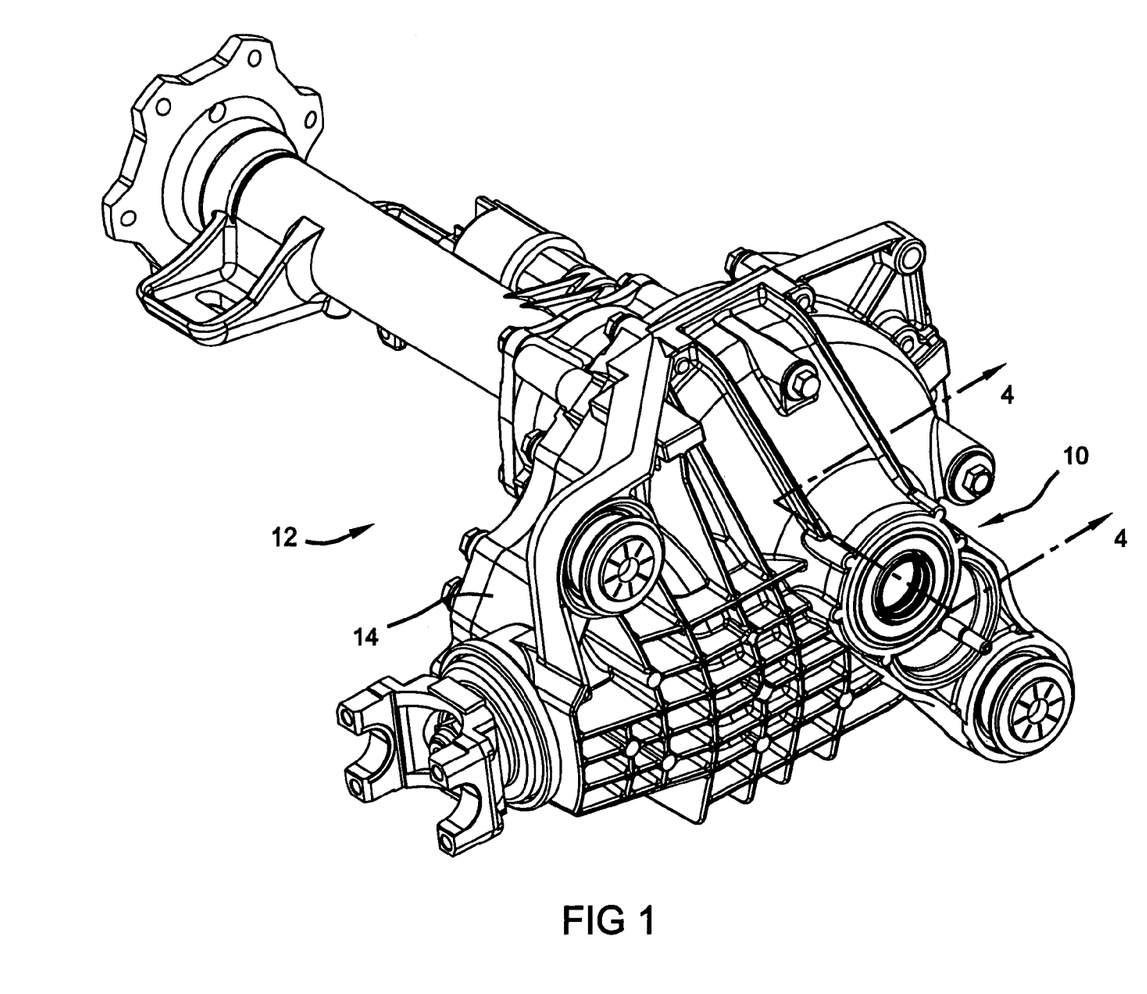
FIG. 1 is a perspective view of an exemplary axle assembly equipped with the bearing adjuster lock assembly of the present invention.
Figure 2:
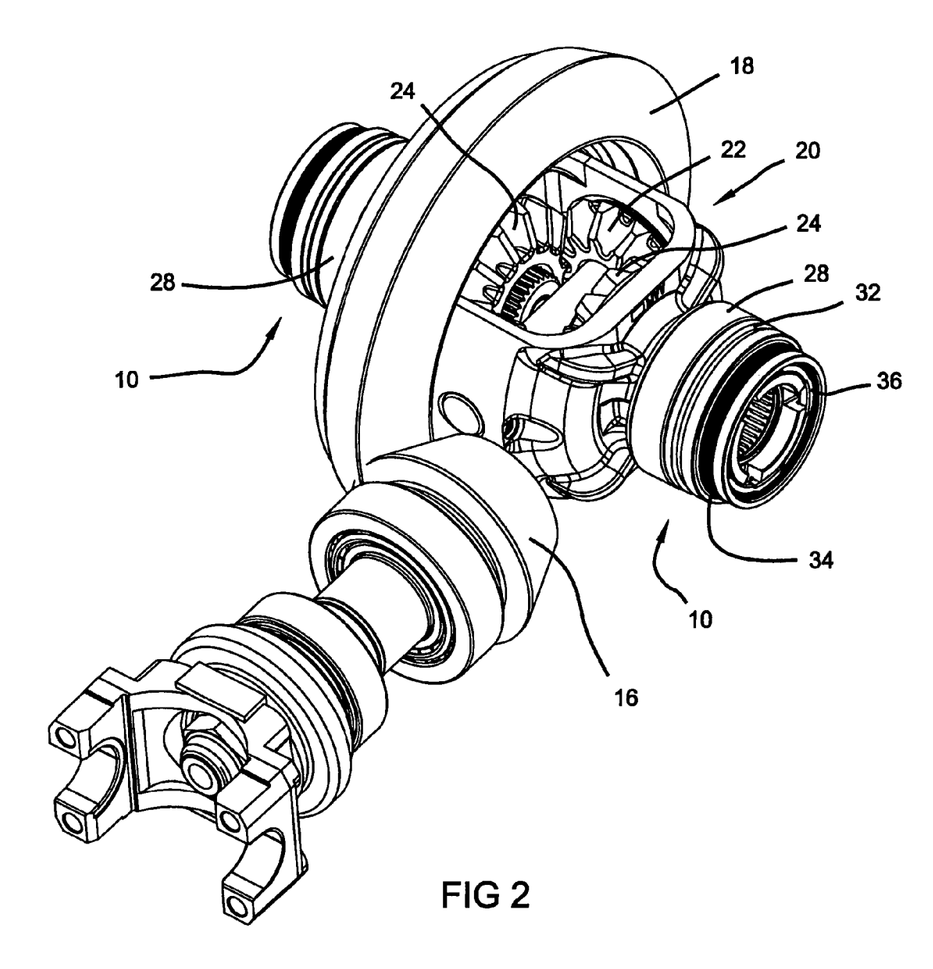
FIG. 2 is a perspective view of the axle assembly of FIG. 1 shown with the axle housing removed for illustrative purposes.

With initial reference to FIGS. 1 and 2, a differential bearing adjuster lock assembly constructed in accordance with the teachings of an embodiment of the present invention is generally identified at reference numeral 10. The adjuster lock assembly 10 is shown operatively associated with an exemplary drive axle assembly 12.

As particularly shown in FIGS. 1 and 2, the drive axle assembly 12 is illustrated to generally include an axle housing 14 for rotatably mounting a hypoid gear set including a pinion gear 16 and a ring gear 18 drivingly interconnected to a differential assembly 20. The differential assembly 20 functions to transfer power to a pair of axle shafts (not shown) while compensating for any difference in axle shaft speed rotation as may occur during a turn or other steering maneuver. In order to compensate for a differential in axle shaft rotational speed, the differential assembly 20 includes a pair of pinion gears 22 and a pair of side gears 24 drivingly interconnected to the axle shafts. To facilitate proper function of the axle assembly 12, the differential assembly 20 is rotatably mounted on a pair of differential bearings 28. The bearings are contained in machined cylindrical bores. Each carrier half includes one bore.

Figure 3:
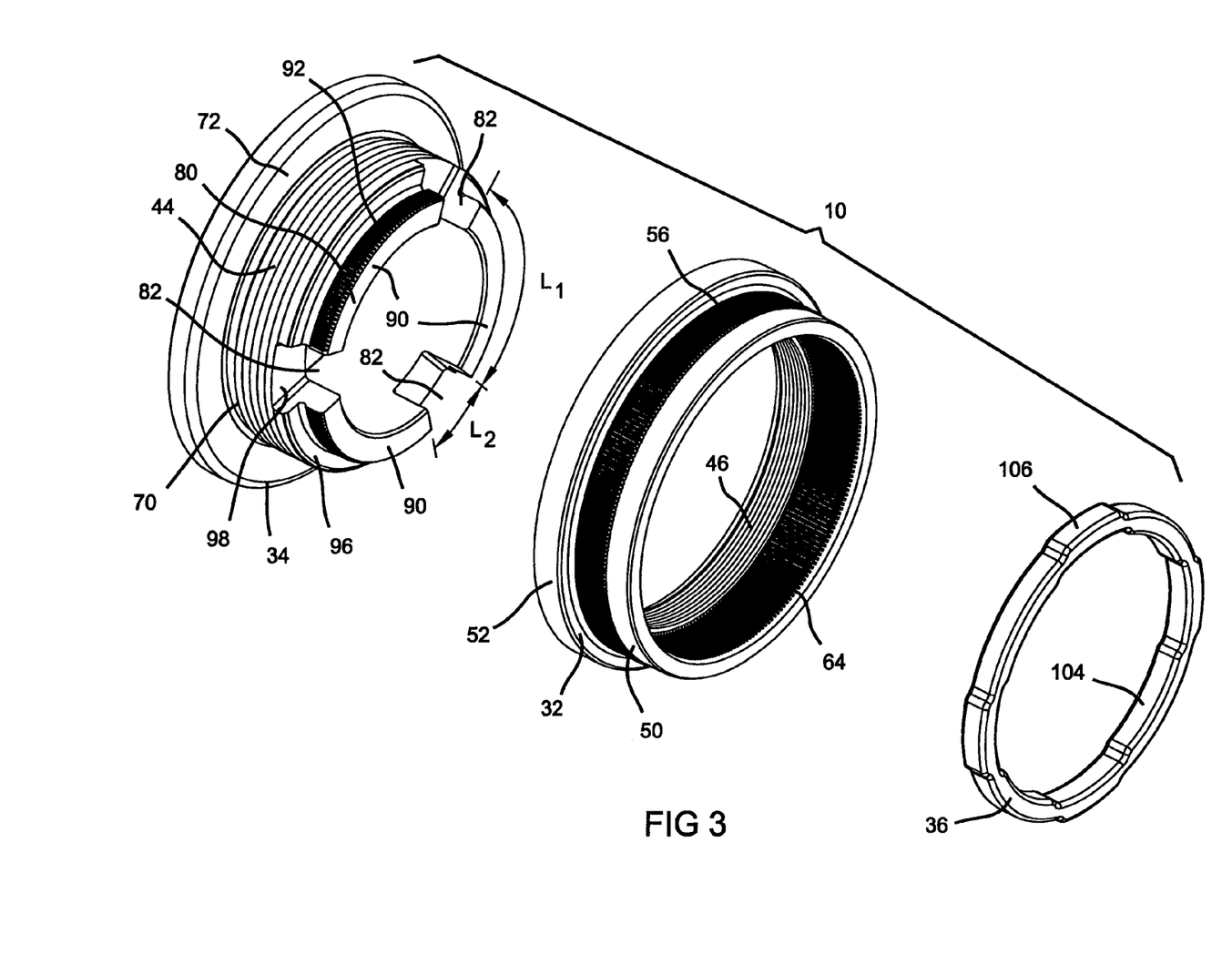
FIG. 3 is an exploded perspective view of the adjuster lock assembly of the present invention.
Figure 4:
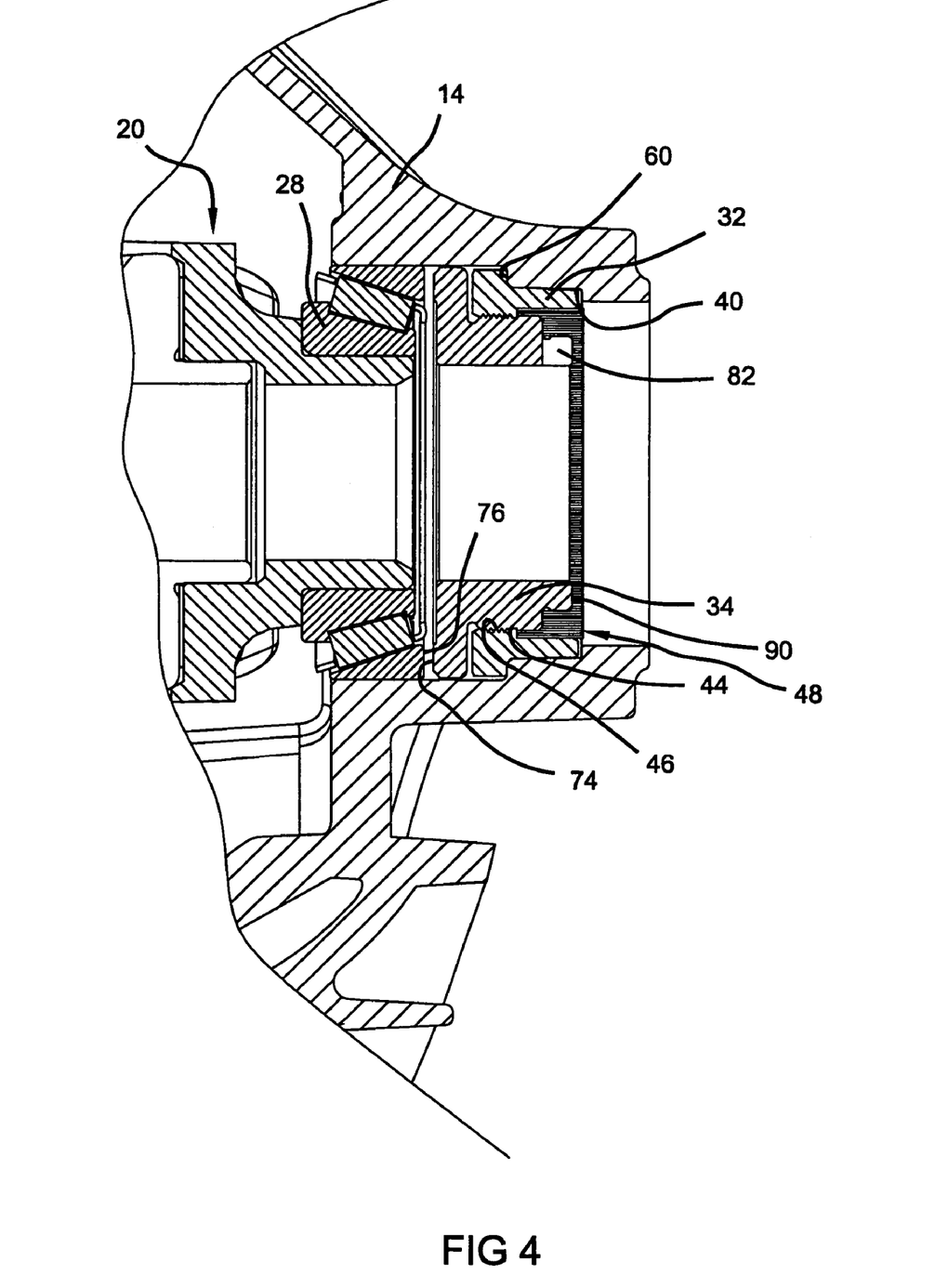
FIG. 4 is a sectional view taken along line 4—4 of FIG. 1 shown with the adjuster sleeve and insert of the adjuster lock assembly press-fit into the axle housing prior to setting bearing preload and gear set backlash.

With continued reference to FIGS. 1 and 2, and further reference to FIGS. 3–6, the adjuster lock assembly 10 will be further described. The adjuster lock assembly 10 is provided to assure optimum differential bearing preload and proper pinion gear to ring gear engagement. The adjuster lock assembly 10 generally includes a bearing adjuster insert 32, a bearing adjuster sleeve 34 and a bearing adjuster lock ring 36. The bearing adjuster insert 32 forms a press-fit with an opening 40 defined in the axle housing 14 and remains fixed relative to housing 14 (FIG. 4). The bearing adjuster sleeve 34 has threads 44 formed on an outer diameter that interface with threads 46 formed on an inner diameter of the bearing adjuster insert 32 (FIG. 3). As will be described in greater detail, rotation of the sleeve 34 relative to the insert 32 forces the differential bearing 28 laterally. As a result, bearing preload and hypoid gear set backlash may be set. Once the desired bearing preload and backlash are set, the bearing adjuster lock ring 36 is press-fit into an annular receiving pocket 48 (as best illustrated in FIG. 4) defined between the insert 32 and the sleeve 34 to lock the angular position of the sleeve 34 relative to the insert 32.

With particular reference now to FIGS. 3 and 4, the insert 32 will be described in greater detail. The insert 32 defines an outer diameter having a first portion 50 and a stepped second portion 52. The first portion 50 includes a plurality of serrations 56 formed thereon for facilitating a press-fit with the opening 40 (FIG. 4) in the axle housing 14. The stepped second portion 52 cooperatively seats on a land 60 formed on the axle housing 14. As explained, once the insert 32 is press-fit into the axle housing 14, it is precluded from rotating. The insert 32 further defines a serrated portion 64 on the inner diameter adjacent to the threaded portion 46. The threaded portion 46 cooperates with the threads 44 on the sleeve 34 and allows the sleeve 34 to advance therealong. The serrated portion 64 on the inner diameter of the insert 32 provides a mating surface for receiving an outer diameter of the lock ring 36.

Figure 5:
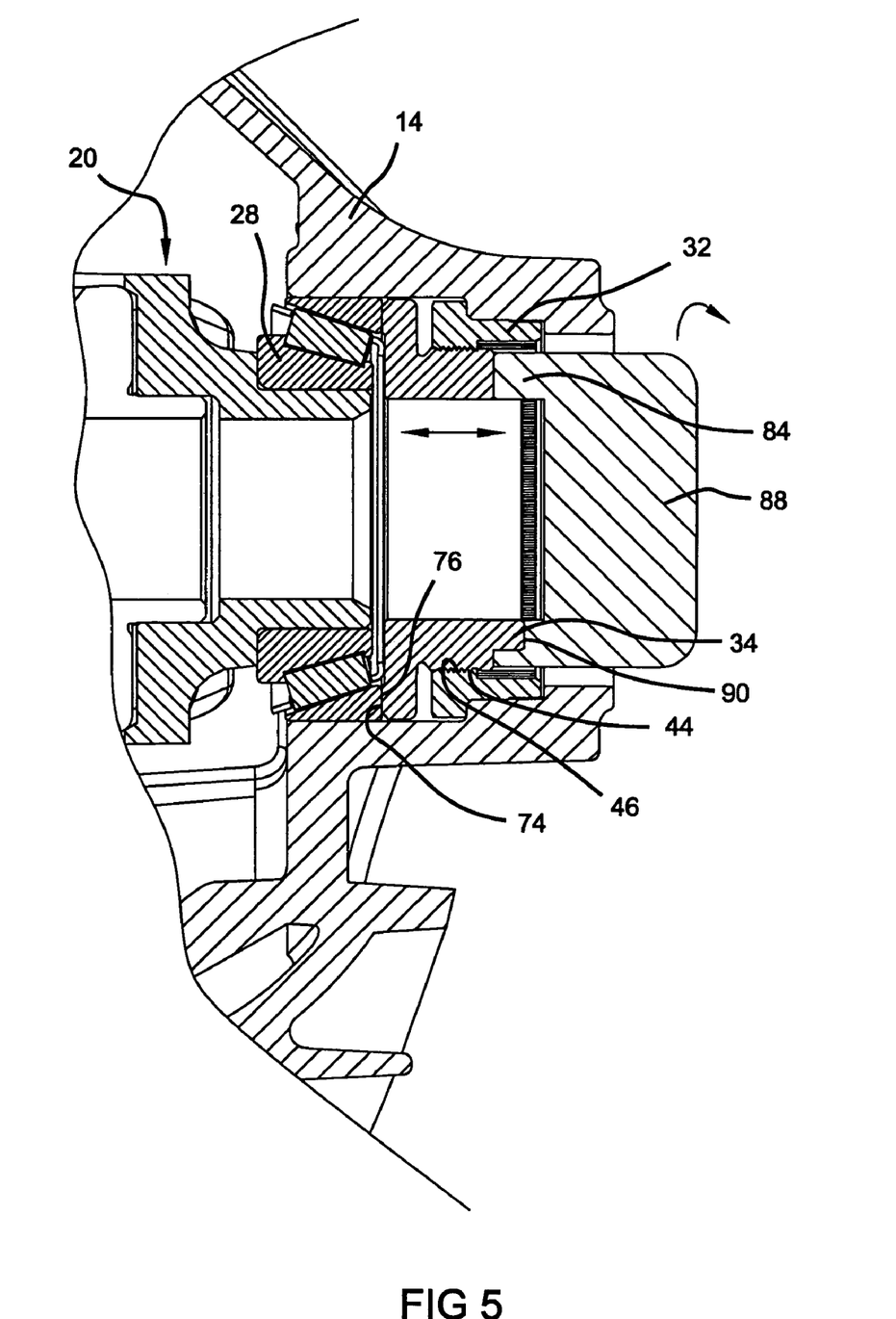
FIG. 5 is a sectional view of the adjuster sleeve and insert of FIG. 4 shown with an installation tool rotatably advancing the sleeve into the bearing assembly to set a preload on the bearing and gear set backlash.

With reference now to FIGS. 3–6, the sleeve 34 will be described in greater detail. As described, the sleeve 34 functions to force the differential bearing 28 laterally and set a desired differential bearing preload and hypoid gear set backlash. The sleeve 34 generally includes a main body portion 70 and a flange portion 72. The main body portion 70 includes the threads 44 formed thereon. An inboard face 74 (FIG. 4) of the flange portion 72 is adapted to engage an outboard face 76 of the differential bearing 28. The main body portion 70 includes a raised wall 80 defining a series of slots 82 (FIG. 3). The slots 82 are formed entirely through the raised wall 80 and terminate into portions of the main body portion 70. The slots 82 are adapted to accept fingers 84 of an installation tool 88 (FIG. 5). The installation tool 88 is used to impart rotational movement onto the sleeve 34 causing the sleeve 34 to move laterally relative to the insert 32 along the respective threaded portions 44 and 46.

A series of raised wall portions 90 collectively form the raised wall 80 and are defined between the respective slots 82. The raised wall portions 90 each define a radial length $L_1$ that is greater than a radial length $L_2$ defined by the slots 82 (FIG. 3). As a result, the raised wall portions 90 provide a robust structure to impart rotational force during bearing preload and gear set backlash adjustments. In the exemplary sleeve 34, the radial length of the raised wall portions 90 and the slots 82 define a ratio of about 3:1. It is appreciated that other ratios may be similarly employed.

The sleeve 34 defines an outer diameter having a serrated portion 92 collectively formed on the raised wall portions 90. The serrated portion 92 provides a mating surface for receiving an inner diameter of the lock ring 36. A ledge 96 is defined at a transition between the main body portion 70 and the raised wall 80 and provides a lateral seat for the lock ring 36 in an installed position. It is noted that the slots 82 extend into the main body portion 70 a distance beyond the ledge 96 (FIGS. 3 and 4). As a result, access between an installed lock ring and a terminal surface 98 of a slot 82 may be gained to forceably remove a lock ring 36 from engagement between the sleeve 34 and the insert 32.

Figure 6:
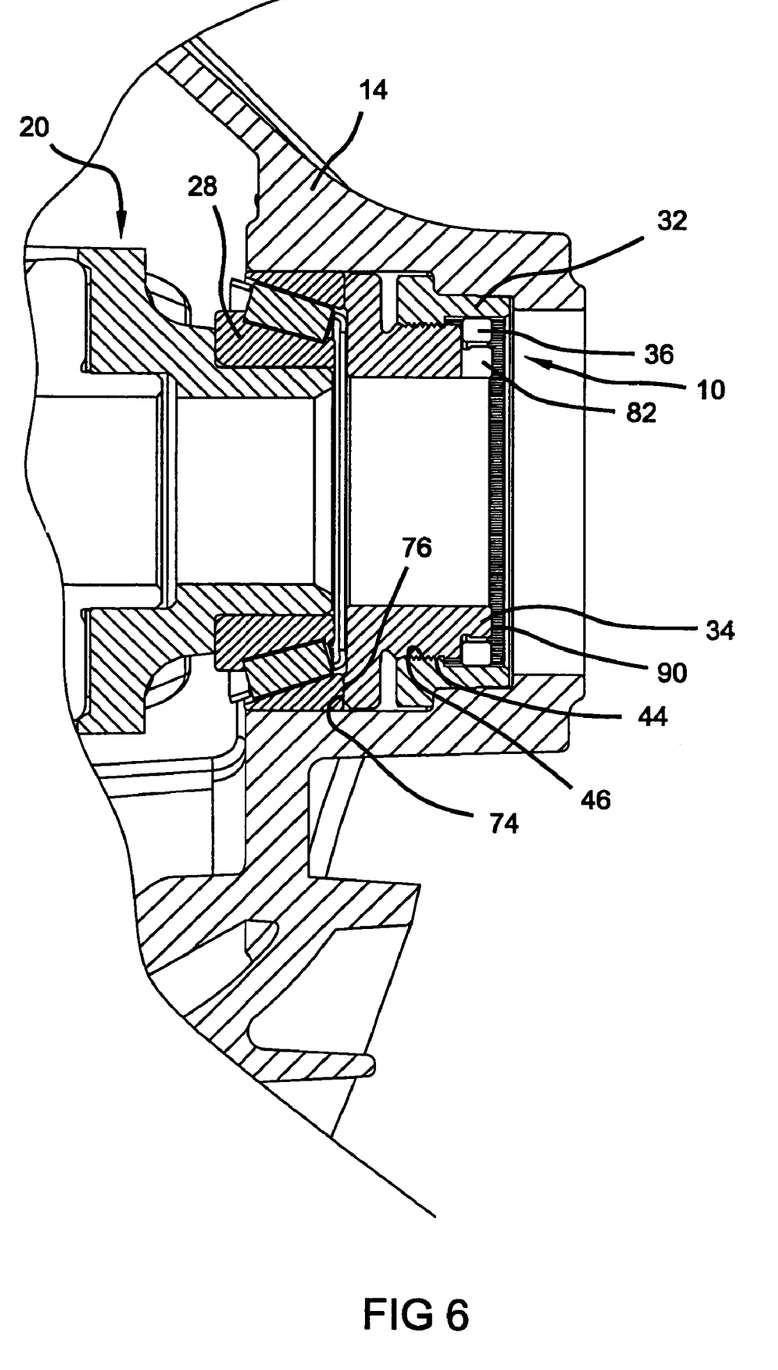
FIG. 6 is a sectional view of the adjuster lock assembly shown in a locked position.

Referring now to FIGS. 3–7 the lock ring 36 will be further described. The lock ring 36 may comprise a stamped metal material or alternatively comprise molded powdered metal. The material is preferably softer than that of the insert and sleeve and may be aluminum. As explained, the lock ring 36 is operable to be press-fit between the outer diameter of the sleeve 34 (at the serrated portions 92) and the inner diameter of the insert 32 (at the serrated portion 64) as shown in FIG. 6. The insert 32 and the sleeve 34 are comprised of materials harder than that of the lock ring 36. In one example, the insert 32 and the sleeve 34 are comprised of powdered metal. The lock ring 36 includes deformable gripping surfaces on an inner diameter 104 and an outer diameter 106 for the respective serrations 64 and 92 of the insert 32 and the sleeve 34 in an installed position. As a result, the respective serrations 64 and 92 of the insert 32 and the sleeve 34, respectively, bite into the lock ring 36 to further enhance a locked condition (FIG. 6). Alternatively, lock ring 36 may be press-fit into smooth bores formed on an insert and a sleeve in lieu of serrations 64 and 92. Once the lock ring is press-fit between the insert 32 and the sleeve 34, the sleeve 34 is precluded from rotation by the mechanical interlock described. Consequently, build variation in gear lash and differential bearing preload is reduced, due to no required sleeve rotational alignment.

Figure 7:
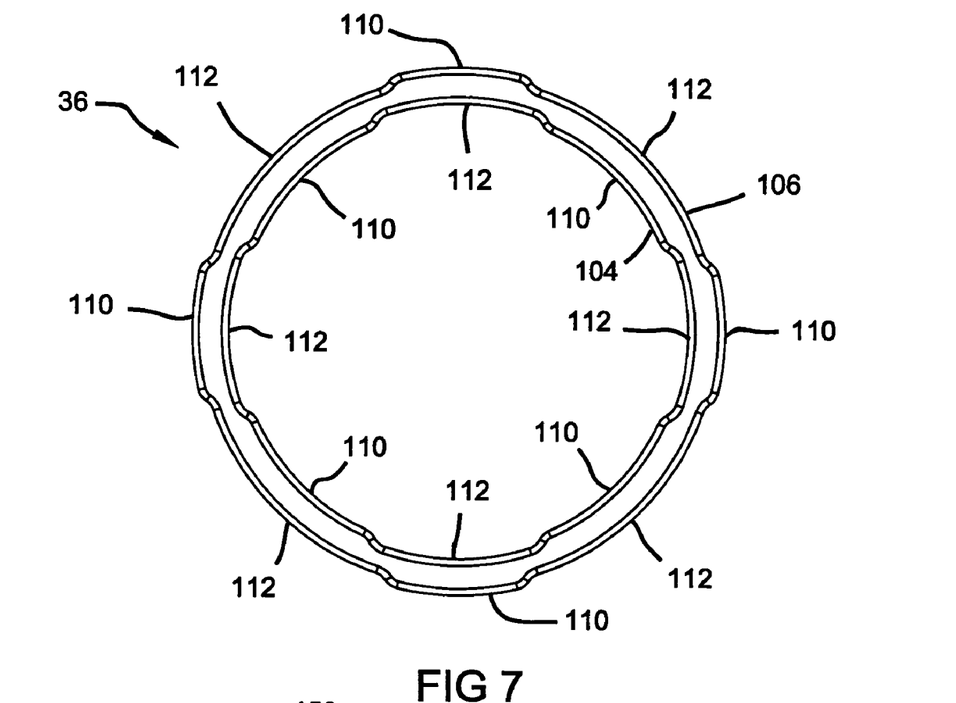
FIG. 7 is a plan view of the lock ring of the adjuster lock assembly of the present invention.

With particular reference to FIG. 7, a series of extension portions 110 are shown formed around the inner and outer diameters 104 and 106 of the lock ring 36. A complementary series of relief portions 112 are formed opposite the extension portions 110. During installation of the lock ring 36, the extension portions 110 partially deflect toward the relief portions 112. The alternating extension portion 110 and relief portion 112 configuration facilitates secure engagement of the lock ring 36 to the insert 32 and the sleeve 34. The alternating extension/relief configuration accommodates for manufacturing variation in component size and alignment.

The lock ring 36 presents a repeatable pattern on its inner and outer diameter 104 and 106, respectively. In this way, the lock ring 36 may be arbitrarily advanced into the annular receiving pocket 48. Installation of the lock ring 36 does not require any alignment, additional fasteners or secondary movement relative to the sleeve 34 or insert 32. As a result, once the sleeve 34 is advanced to a position such that the desired bearing preload and gearset backlash are set, the lock ring 36 may be immediately installed.

Figure 8:
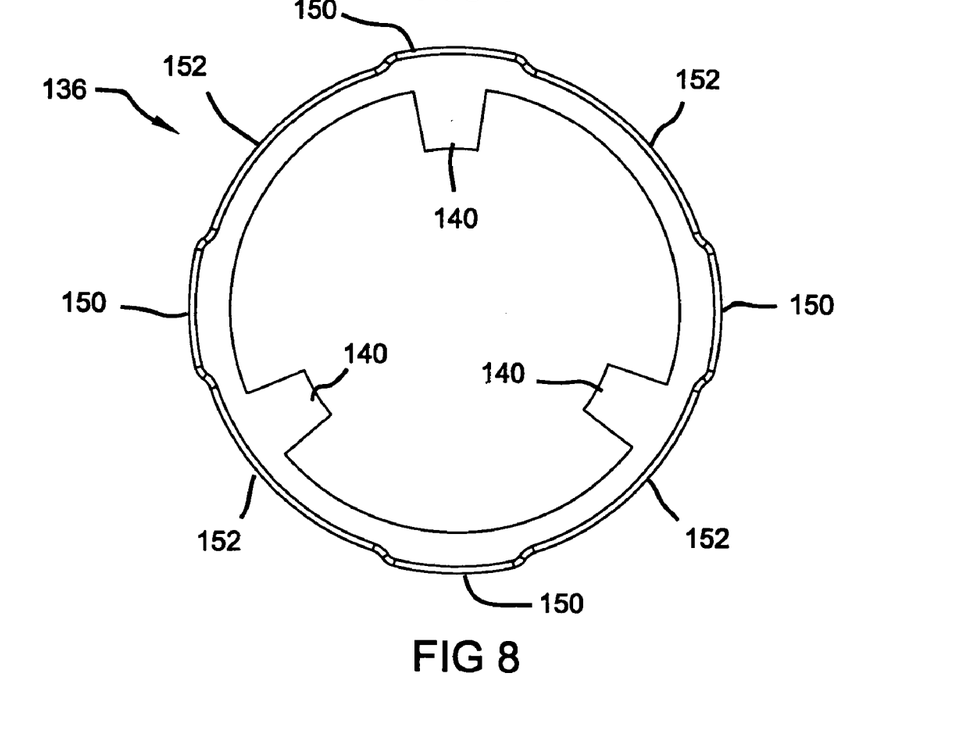
FIG. 8 is a plan view of a lock ring according to a second configuration of the present invention.
Figure 9:
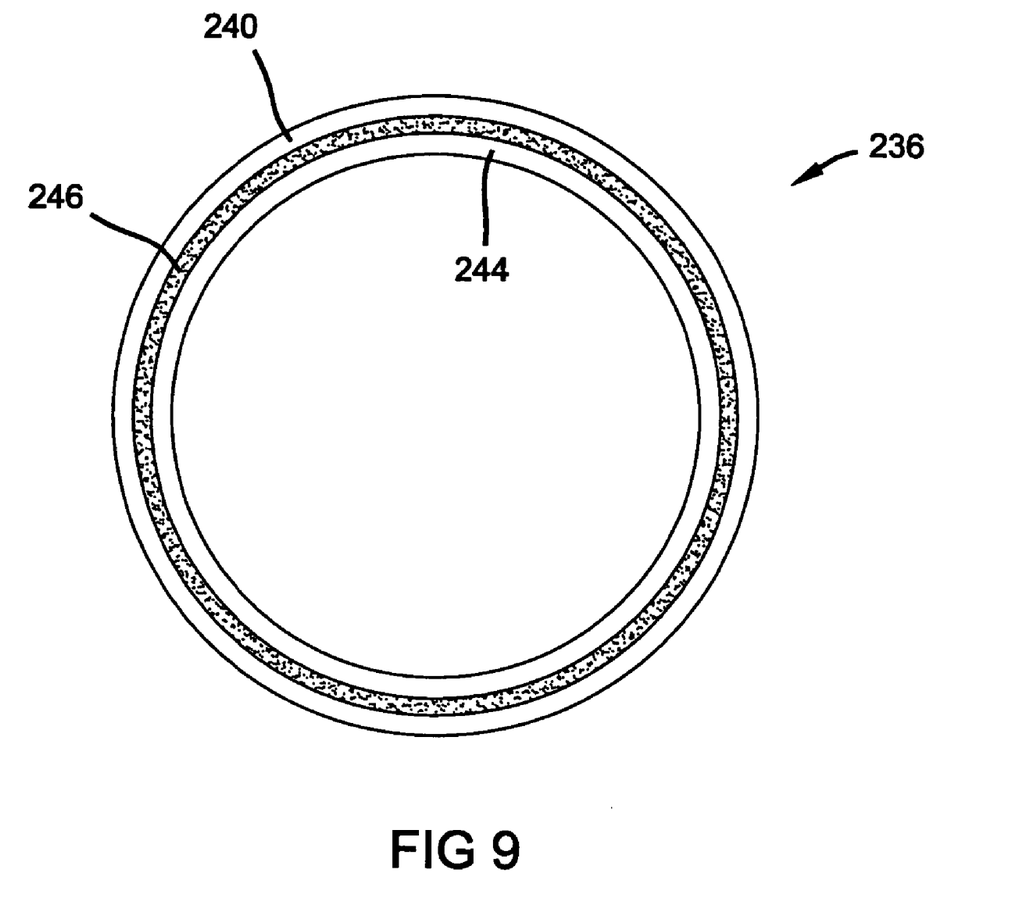
FIG. 9 is a plan view of a lock ring according to a third configuration of the present invention.

Turning now to FIGS. 8 and 9, lock rings 136 and 236 according to additional configurations are shown. Lock ring 136 includes a series of teeth 140 arranged around an inner diameter 144. The teeth are configured to be accepted in the complimentary slots 82 of the sleeve 34 in an installed position. An outer diameter 146 includes a series of extension portions 150 and relief portions 152 arranged thereon. While the inner diameter 144 is shown as having a substantially uniform radius between adjacent teeth 140, the inner diameter may alternatively include extension and relief portions as described in relation to lock ring 36. The lock ring 136 is adapted to be press-fit into the annular smooth bore embodiment of the pocket 48 defined by the insert 32 and the sleeve 34.

Lock ring 236 includes an outer ring member 240, an inner ring member 244 and an intermediate portion 246. The inner and outer rings 240 and 244 may be comprised of similar materials as described in relation to lock ring 36. The intermediate portion 246 is securably attached between the outer and inner ring members 240 and 244. The intermediate portion 246 is comprised of a compliant material such as rubber for example. The lock ring 236 is adapted to be press-fit into the annular pocket 48 defined by the insert 32 and the sleeve 34. The compliant properties of the intermediate portion 246 encourage the outer ring member 240 to be biased outwardly into the smooth bore 64 of the insert 32 and the inner ring member 244 to be biased inwardly into the smooth bore 92 of the sleeve 34. In another configuration, the inner and outer ring members 240 and 244 may define a unitary piece without the intermediate portion 246.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for maintaining a differential bearing preload in an axle assembly, the method comprising:
   coupling a bearing insert to an axle housing;
   rotatably coupling an adjuster sleeve to said bearing insert;
   supporting a differential assembly in said axle housing with a differential bearing;
   rotatably advancing said adjuster sleeve relative to said bearing insert into engagement with said differential bearing; and
   engaging a lock ring with said bearing insert and said adjuster sleeve by forming a press-fit between an inner diameter of said bearing insert and an outer diameter of said lock ring and an outer diameter of said adjuster sleeve and an inner diameter of said lock ring, said lock ring precluding relative rotation between said bearing insert and said adjuster sleeve.

2. The method of claim 1 wherein forming a press-fit comprises linearly translating said lock ring along an axis defined by said adjuster sleeve.

3. The method of claim 2 wherein said linearly translation of said lock ring occurs without rotation of said lock ring.

4. The method of claim 1 wherein forming a press-fit includes deflecting portions of said lock ring to provide a retention force.

5. The method of claim 1 wherein rotatably advancing said adjuster sleeve includes drivingly engaging a plurality of slots formed in said adjuster sleeve.

6. The method of claim 1 wherein said adjuster sleeve is rotated until a predetermined bearing preload and gear set backlash is reached.

7. The method of claim 1, further comprising:
   measuring a preload on said differential bearing;
   measuring a backlash on a gear set in said differential assembly; and
   at least one of advancing and retracting said adjuster sleeve relative to said bearing insert to achieve a desired preload and backlash measurement.

8. The method of claim 1 wherein coupling said bearing insert to said axle housing includes fixing said bearing insert to said axle housing by forming a press-fit between said axle housing and said bearing insert.

9. The method of claim 1 wherein said adjuster sleeve is rotatably coupled to said bearing insert prior to coupling said bearing insert to said axle housing.

10. An axle assembly comprising:
    an axle housing;
    a differential assembly supported in said axle housing with a differential bearing;
    a bearing insert mounted on said axle housing and having inner serrations defined around an inner surface;
    an adjuster sleeve rotatably coupled to said bearing insert and having outer serrations defined around an outer diameter, said adjuster sleeve being adapted to engage said differential bearing and impart a preload force thereon;
    a lock ring being positioned between said bearing insert and said adjuster sleeve, said lock ring precluding relative movement between said bearing insert and said adjuster sleeve thereby maintaining a desired preload on said differential bearing.

11. The axle assembly of claim 10 wherein said adjuster sleeve includes an annular wall having a plurality of slots radially extending therethrough.

12. The axle assembly of claim 11 wherein said annular wall and said plurality of slots define a plurality of raised wall portions positioned between said plurality of slots.

13. The axle assembly of claim 12 wherein said raised wall portions each define a wall radial length and wherein said slots each define a slot radial length, wherein said wall radial length is greater than said slot radial length.

14. The axle assembly of claim 13 wherein said wall radial length and said slot radial length define a ratio of about 3:1.

15. The axle assembly of claim 14 wherein said plurality of slots includes about three slots and wherein said plurality of wall portions includes about three wall portions.

16. The axle assembly of claim 10 wherein said adjuster sleeve is rotatably coupled to said bearing insert and positioned at a retracted position prior to coupling said bearing insert to said axle housing.

17. The axle assembly of claim 16 where said adjuster sleeve is moveable from said retracted position to an advanced position in engagement with said differential bearing.

18. The axle assembly of claim 10 wherein said lock ring engages said inner and outer serrations.

19. The axle assembly of claim 10 wherein said lock ring is comprised of powdered metal.

20. The axle assembly of claim 10 wherein an outer diameter of said bearing insert forms an annular wall having a press-fit between an inner diameter defined by an opening in said axle housing.

21. A method for maintaining a differential bearing preload in an axle assembly comprising:
    coupling a bearing insert to a first portion of an axle housing, said bearing insert having an adjuster sleeve rotatably coupled thereto, said bearing insert and said adjuster sleeve collectively defining an annular pocket therebetween;
    supporting a differential assembly in said axle housing with a differential bearing;
    rotatably advancing said adjuster sleeve into engagement with said differential bearing to achieve a desired preload; and
    advancing a lock ring into a press-fit relationship with said bearing insert and said adjuster sleeve at said annular pocket, said lock ring preventing rotation of said adjuster sleeve and thereby maintaining said differential bearing at said desired preload.

22. The method of claim 21 wherein advancing said lock ring includes press-fitting said lock ring between serrated surfaces defined on each of an inner diameter of said bearing insert and an outer diameter of said adjuster sleeve.

23. An axle assembly comprising:
    an axle housing;
    a differential assembly supported in said axle housing with a differential bearing;
    a bearing insert mounted on said axle housing;
    an adjuster sleeve rotatably coupled to said bearing insert, said adjuster sleeve being adapted to engage said differential bearing and impart a preload force thereon; and
    a lock ring precluding relative movement between said bearing insert and said adjuster sleeve for maintaining a desired preload on said differential bearing, said lock ring having extension portions defined around an inner diameter and an outer diameter thereof, said extension portions being adapted to deflect upon advancement of said lock ring into engagement with said bearing insert.

* * * * *